United States Patent [19]

Katz et al.

[11] Patent Number: 5,079,396
[45] Date of Patent: Jan. 7, 1992

[54] MICROWAVE COFFEE PERCOLATING DEVICE

[75] Inventors: Saul N. Katz, Monsey, N.Y.; Warren C. Rehman, Flemington, N.J.

[73] Assignee: Kraft General Foods, Inc., Glenview, Ill.

[21] Appl. No.: 453,641

[22] Filed: Dec. 20, 1989

[51] Int. Cl.⁵ .............................................. H05B 6/80
[52] U.S. Cl. ...................... 219/10.55 E; 219/10.55 F; 99/308; 99/DIG. 14
[58] Field of Search .................. 219/10.55 E, 10.55 F, 219/10.55 R, 10.55 D; 99/308, 309, 310, 311, 312, 302 R, 300, DIG. 14; 426/241

[56] References Cited

U.S. PATENT DOCUMENTS

| | | | |
|---|---|---|---|
| 2,601,067 | 6/1952 | Spencer | 219/10.55 E |
| 3,174,424 | 3/1965 | Serio | 99/312 |
| 3,215,060 | 11/1965 | Perlov | 99/306 |
| 4,104,957 | 8/1978 | Freedman et al. | 219/10.55 E |
| 4,210,124 | 7/1980 | Husslein et al. | 219/10.55 E |
| 4,233,325 | 11/1980 | Slangan et al. | 219/10.55 E |
| 4,381,696 | 5/1983 | Koral | 219/10.55 G |
| 4,416,906 | 11/1983 | Watkins | 219/10.55 E |
| 4,495,392 | 1/1985 | Derby | 219/10.55 E |
| 4,642,443 | 2/1987 | Jorgensen et al. | 219/10.55 E |
| 4,721,835 | 1/1988 | Welker | 219/10.55 G |
| 4,756,915 | 7/1988 | Dobry | 426/234 |
| 4,778,969 | 10/1988 | LeViet | 219/10.55 A |

Primary Examiner—Philip H. Leung
Attorney, Agent, or Firm—Thomas A. Marcoux; Linn I. Grim; Thomas R. Savoie

[57] ABSTRACT

A microwave brewing device for producing freshly percolated measured quantities of coffee, and more particularly, a percolating device which is adapted to percolate coffee within a microwave oven. An open cup is adapted to be filled with water up to a specific level and volume adequate to brew at least a single cup of freshly percolated coffee beverage. The cup or the percolating device therein may be shielded with a shielding material which is impervious to the passage of microwave energy, and only the lower portion of the cup or percolating device may be provided with a gap or constituted of a microwave-transparent region permitting the passage therethrough of microwave energy in order to heat the water contained in the cup wherein the latter is positioned in the cavity of a microwave oven.

18 Claims, 5 Drawing Sheets

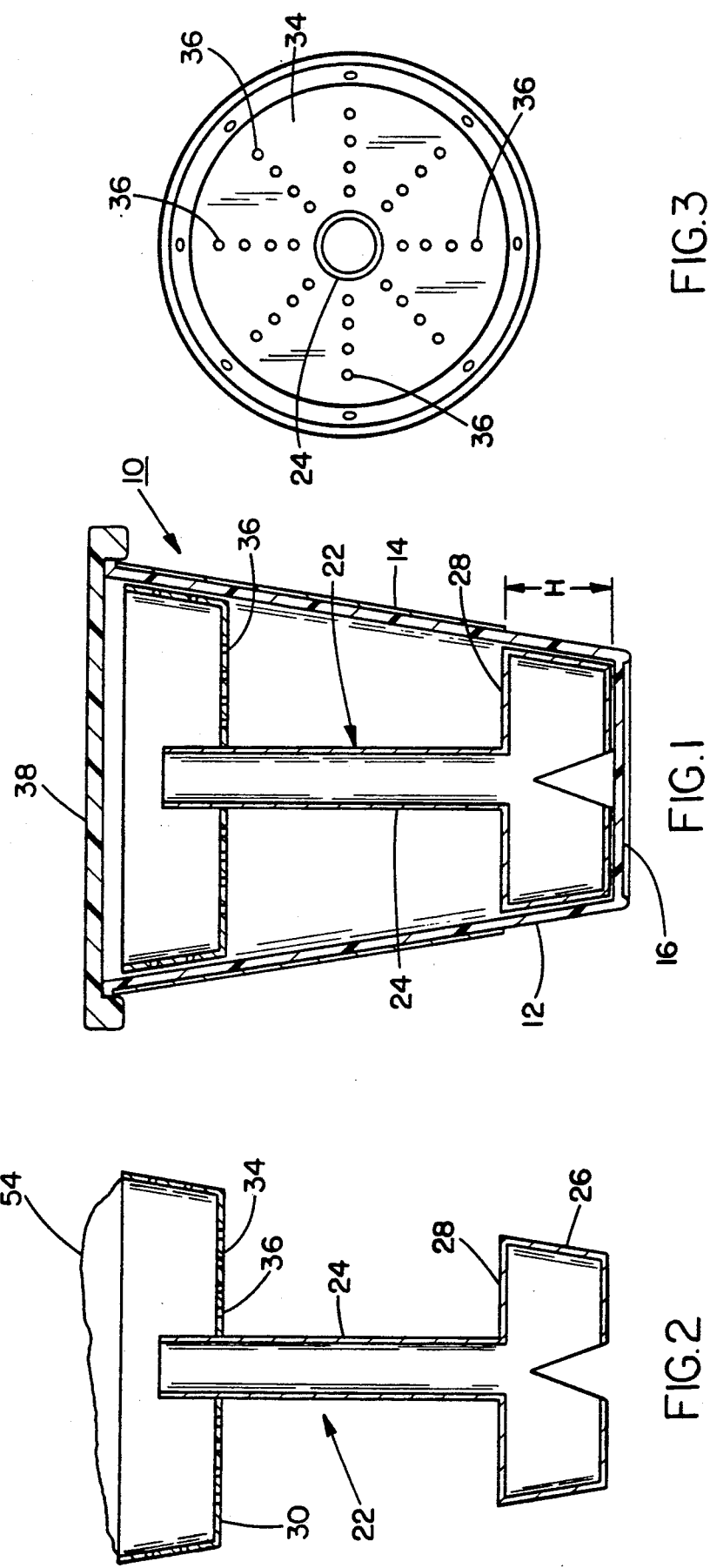

MICROWAVE COFFEE PERCOLATING DEVICE

BACKGROUND OF THE INVENTION

1. Field of the Invention

The present invention relates to a microwave brewing device for producing freshly percolated measured quantities of coffee, and more particularly, a percolating device which is adapted to percolate coffee within a microwave oven. Various kinds of appliances and coffee brewing devices which are designed to brew coffee or tea and other types of beverages under the effect of microwave energy in microwave ovens are well-known in industry. In general, such microwave brewing devices consist of microwaveable pots or cups each designed to receive a predetermined measured quantity of water, and which are provided with brewing baskets or support surfaces for the receipt of measured amounts of coffee or tea, either loosely or in flow-through packages. Usually, such devices are transparent to microwave energy in at least some regions in order to enable the water in the pot or cup to be brought to the boiling point and to facilitate the hot liquid being admixed with the coffee, or tea and the like, for purposes of brewing the latter to a certain strength in conformance with the taste of a consumer, in dependence upon the time in which the brewing device or appliance is subjected to microwave energy.

Generally, such microwave brewing devices are of a sturdy construction so as to be reusable in nature, and subsequent to the brewing operation and dispensing or consumption of the brewed beverage therefrom, can be expediently washed and dried, possibly in a dishwasher, and repeatedly reused for the brewing of coffee, tea or the like. In essence, such microwaveable coffee brewing devices or appliances are complex in construction and produced from relatively expensive material so as to necessitate their having to be reemployed a considerable number of times in order to render the manufacture and use thereof economically viable.

In order to improve upon the currently employed devices or appliances which are utilized for the brewing of coffee or similar kinds of beverages through the applications of microwave energy, and to render this an inexpensive and relative simple procedure, the present invention contemplates the provision of a device for the microwave brewing, and particularly, percolating of coffee through the intermediary of microwave energy in order to produce a freshly percolated coffee beverage, and in which at least some, if not all, of the constituents of the microwave brewing device are designed to be inexpensively constructed so as to render them expendable and thereby discardable after only a single use. This will eliminate the necessity for having to wash a multiplicity of relatively expensive components, inasmuch as most of the constituents of the device, and in certain instances, possibly the entire device itself, may be readily discarded after only a single use in a microwave oven.

2. Discussion of the Prior Art

Although numerous microwaveable devices are currently in existence for the brewing of coffee or tea beverages in microwave ovens, all of these devices incorporate components which, due to their complex and expensive construction, in order to be cost-effective necessitate their having to be reused subsequent to washing thereof rather than being economically discardable after only a single use.

Freedman, et al. U.S. Pat. No. 4,104,957 discloses a microwave coffee maker in which a container of a construction which is transparent to microwave energy is positioned in the cavity of a microwave oven, and which incorporates structure for supporting a selected measure of ground coffee beans within a filter element which is mounted over an upper container cavity. The lower portion of the pot is then filled with water to a desired level, and thereafter exposed to microwave energy within the microwave oven for a specified period of time depending upon the amount and desired strength of the coffee beverage being brewed. The structure of this brewing device is relatively complex and expensive in nature and, consequently necessitates the repeated employment of the appliance components in order to render the latter economical.

Derby U.S. Pat. No. 4,495,392 discloses a microwave simmer pot, in which the pot containing a liquid which is to be simmered is positioned in the cavity of a microwave oven, and in which various regions of the simmer pot are insulated so as to form a shield for reflecting microwave energy, whereas other portions permit the passage therethrough of the microwave energy in order to enable heating of the liquid contained in the pot. Although this provides for a simple construction of a cup-shaped pot for simmering a liquid, the construction thereof does not facilitate the percolating of coffee so as to provide a freshly percolated coffee brew of desired strength and quantity.

Welker U.S. Pat. No. 4,721,835 discloses a microwave brewing cup in which steam generated in a lower container portion by heating water through microwave energy will traverse a measure of packaged coffee in order to produce a brewed mixture. There is no disclosure of an inexpensive and disposable brewing device analogous to the present invention for the production of freshly percolated quantities of coffee, and in which at least some, if not all, of the components of the microwaveable device are economically discardable after only a single use.

Koral U.S. Pat. No. 4,381,696 discloses a microwave coffee making apparatus, in which the structure thereof is of an extremely complex nature requiring a multiplicity of components for effectuating the brewing of quantities of coffee in the apparatus. The construction of this particular microwave coffee making apparatus is quite expensive due to its complexity and does not lend itself towards the discarding thereof, or at least some of the components of the apparatus, after only a single use in a microwave oven.

Dobry U.S. Pat. No. 4,756,915 discloses a process for preparing a brewed beverage in a single-serving cup of microwave-transparent material by passing microwave energy through coffee enclosed in a flow-through filter pouch which is adapted to be at least partially immersed in liquid. The microwave energy will then heat the liquid to a point at which it causes the coffee to be brewed and dissolved in the liquid in response to generated pulsations of the pouch containing the coffee. This particular microwaveable device and method of brewing a coffee or tea beverage does not lend itself towards the production of freshly percolated quantities of coffee and is primarily directed to the brewing of soluble or so-called instant coffee.

Further appliances adaptable for microwave brewing of beverages are disclosed in Perlov U.S. Pat. No.

3,215,060; Slangan, et al. U.S. Pat. No. 4,233,325 and Serio U.S. Pat. No. 3,174,424. However, none of these appliances disclose a readily discardable coffee percolating device which is adapted to be employed in a microwave oven in a manner analogous to the inventive structure.

SUMMARY OF THE INVENTION

Thus, in essence, the inventive microwave brewing device for producing freshly percolated quantities of coffee in a microwave oven may be employed in the producing of a single-serving beverage consisting of a cup of freshly percolated coffee, and in which at least portions of the microwave percolating device, and possibly the entire device, is so inexpensive in construction as to render these components or the entire device economically disposable after only a single use thereof.

In particular, the coffee percolating device contemplates the provision of an open cup which is adapted to be filled with water up to a specific level and volume adequate to brew at least a single cup of freshly percolated coffee beverage. The cup is shielded about the circumference thereof with a shielding material which is impervious to the passage of microwave energy, and only the lower portion of the circumference of the cup may be provided with a gap or constituted of a microwave-transparent region permitting the passage therethrough of microwave energy in order to heat the water contained in the cup when the latter is positioned in the cavity of a microwave oven. The inside of the cup is adapted to receive a standard type of percolating structure, essentially consisting of a hollow vertical tube or stem which supported on a lower stand or pedestal, the latter of which has a surface spaced above the bottom thereof which is covered with a metallic foil or the like material forming a barrier to shield the upper portion of the percolating device and cup interior in that region from microwave energy. The upper end of the stem which is located at a height proximate the upper rim of the cup includes either a perforated basket for the receipt of a predetermined quantity of fresh ground coffee, the latter of which may be encased in a pouch of a flow-through filter material or simply loosely positioned in the perforated basket; or may include a horizontal platform at the upper end of the vertical stem on which a quantity of freshly ground coffee enclosed in a pouch of filter material may be supported. The cup may then be closed by means of a suitable cover or lid, also provided with a shielding against the passage therethrough of microwave energy, and the entire assembly then positioned in the cavity of a microwave oven in which the lower portion of the cup is subjected to microwave energy because of its being transparent to microwaves, causing the water to be brought to its boiling point and percolating upwardly through the percolating stem or tube in order to brew the coffee supported thereon, as is known with respect to coffee percolators. Upon the coffee being percolated for a specific period of time in the microwave oven in dependence upon the desired strength for the beverage, the device is then removed, the cover detached therefrom and the components consisting of the stem, stem support or pedestal and basket, including the now spent ground coffee, are lifted out of the cup, with only the freshly brewed beverage remaining therein adapted to be dispensed and consumed. The entire percolating components of the device and/or the cup may then be discarded after a single use depending upon the type of material from which the components are constructed.

Accordingly, it is an object of the present invention to provide a microwaveable device for the brewing of percolated quantities of coffee in a microwave oven.

A more specific object of the present invention is the provision of a microwave brewing device for producing freshly percolated coffee of the type described, in at which at least some of the components are inexpensively constructed so as to enable their economical discarding thereof after only a single use.

Yet another object of the present invention resides in the provision of a microwave coffee brewing device, in which the latter provides single servings of freshly percolated coffee, and in which at least a portion, and possibly the entire device may be discarded after a single use thereof in a microwave oven.

BRIEF DESCRIPTION OF THE DRAWINGS

Reference may now be had to the following detailed description of exemplary embodiments of a microwave coffee brewing device pursuant to the invention, taken in conjunction with the accompanying drawings; in which:

FIG. 1 illustrates a vertical sectional view through a microwave coffee brewing device constructed pursuant to the invention;

FIG. 2 illustrates a generally schematic vertical sectional view through a percolating insert component for the coffee brewing device;

FIG. 3 illustrates a top plan view of the percolating component of FIG. 2;

DETAILED DESCRIPTION

Figure 5:
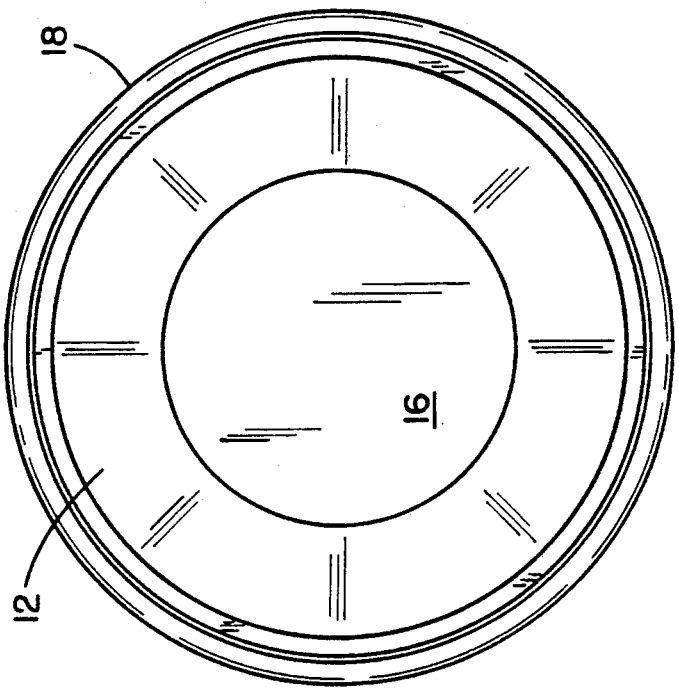
FIG. 5 illustrates a top plan view of the cup and sleeve assembly of FIG. 4.

Referring now in more specific detail to the drawings, and especially FIGS. 1, 2 and 3, there is disclosed a microwave brewing device 10 for the production of a freshly percolated coffee beverage. In essence, the device 10 includes a cup member 12 having an upwardly widening frusto-conical circumferential sidewall 14, and a cup bottom 16 which is of generally conventional planar shape. The cup 12 is of an open-top configuration, as is normal for drinking cups of this type. The cup 12 may, in general, be formed from any suitable plastic or paperboard material which may be impregnated so as to render the latter liquid-impervious and resistant to heat, such as is necessary when a liquid is to be contained (and brewed) in the cup at or close to a boiling point of 212° F. The cup may have the major portion of the height thereof, spaced upwardly from the bottom, encompassed by a metallic foil material which constitutes a shield against the passage therethrough of microwave energy, while the unshielded lower end portion of the sidewall of the cup 12; for instance, up to a height H, is essentially transparent to microwave energy. This type of construction for the cup 12, in which the latter is encompassed by the inexpensive foil material, which may be laminated thereto, over the major portion of the height thereof, renders the cup extremely inexpensive to make and readily disposable after only a single use.

Figure 4:
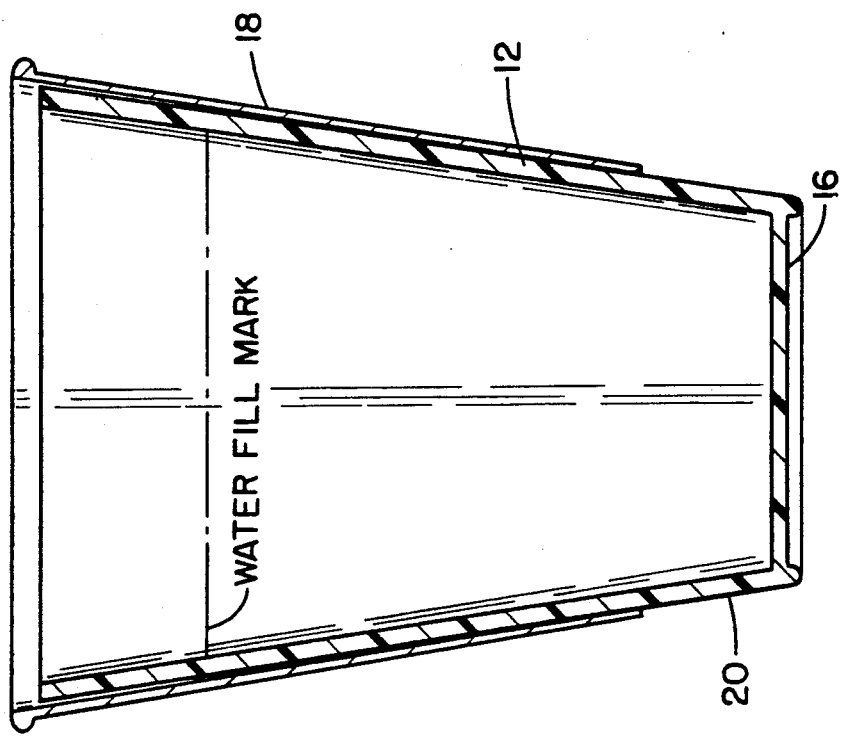
FIG. 4 illustrates a vertical sectional view through a cup and sleeve assembly which is utilizable in conjunction with the microwave coffee brewing device.
Figure 7:
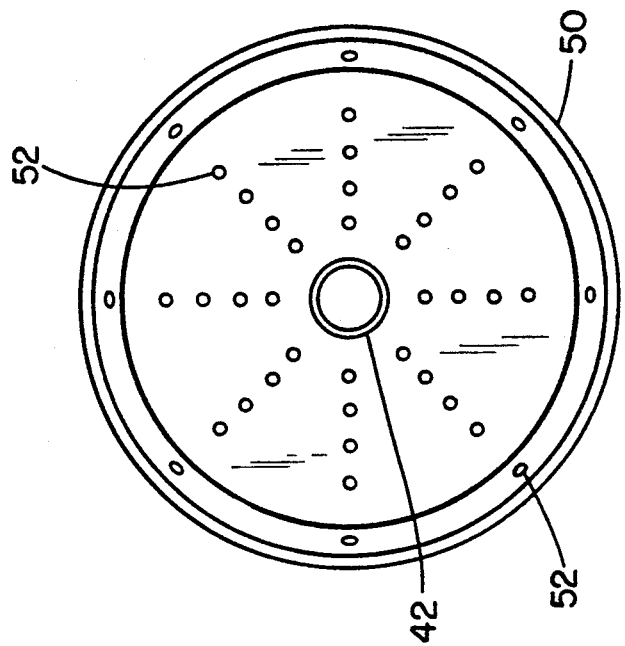
FIG. 7 illustrates a top plan view of the arrangement of FIG. 6.
Figure 6:
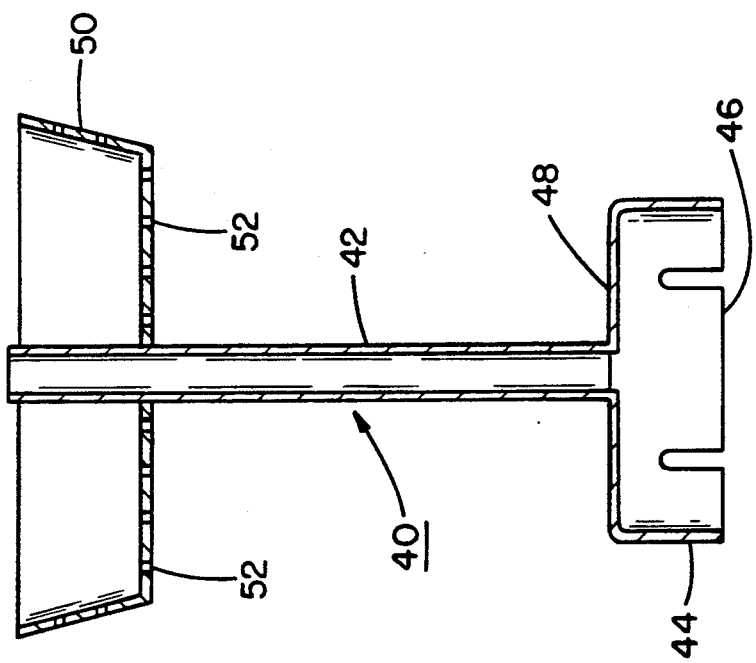
FIG. 6 illustrates a vertical sectional view through a modified percolating arrangement employable in conjunction with the, inventive coffee brewing device.

Alternatively, the cup 12 may be constructed as shown in the embodiment of FIGS. 4 and 5 of the drawings, in which the cup 12 is constituted from a paper or plastic material as set forth hereinbefore to be disposable after a single use, and has the upper circumferential sidewall portion encompassed by a detachable and reusable metal sleeve 18. The portion of the cup which is encompassed by a metal sleeve 18 is shielded against the through passage of microwave energy, while the sleeve, which may have an interlock at its upper end preventing it from sliding down from the upper rim or lip of the cup 12 extends downwardly to terminate at some distance above the bottom of the cup so as to provide an open gap 20 therebelow for the through-passage of microwave energy.

Adapted to be arranged within the cup 12 is a suitable percolating unit 22 which, as shown in FIGS. 2 and 3, may be of a paperboard or plastic material construction. The percolating unit 22 includes an upright hollow tube or stem 24, which has a large diameter cylindrical pedestal support at its lower end adapted to rest on the interior surface of the bottom of the cup 12 when inserted therein, and with the support 26 having a superimposed foil spaced at the distance H above the bottom of the cup so as to form a shielding barrier against the upward passage therethrough of microwave energy. In essence, the region within the cup 12 above the foil 28 will be essentially fully shielded against the ingress of microwave energy.

The hollow tube 24 extends upwardly within the cup to terminate a short distance below the rim or lip of the cup, and supports a basket 30 having a cylindrical or upwardly widening sidewall 32 and a bottom plate 34 incorporating a plurality of predetermined spaced perforations 36 to allow for the through-flow of water. The basket 30 is adapted to receive a predetermined measured quantity of coffee commensurate with the quantity of water in the cup so as to produce the desired amount of brewed beverage subsequent to completion of the percolating procedure in the microwave oven.

Superimposed on the cup 12, and over the percolating unit 22 which contained therein, is a suitable lid cover 38 which may also be constituted of foil-lined plastic or paper to be disposable, or made of metal, for reuse and order to provides a shielding against the ingress of microwave energy from above. If desired, the cover 38 can be provided with a central cutout which incorporates a domed glass or plastic structure which may have metal filaments embedded to form a barrier to microwave energy, while facilitating external viewing over the percolating action of the entire microwave percolating device 10.

In a modified embodiment of a percolating unit 40, which can be readily employed with either of the cup structures shown in FIGS. 1 and 4, the percolating unit 40 may be of a reusable construction rather than discardable after a single use. Thus, the upright hollow stem 42 may be constituted of either plastic material or metal, whereas the lower end pedestal support 44, which is in the form of an inverted cup member and adapted to have its annular bottom edge 46 resting on the inner surface of the cup bottom 16, has the sidewalls of the cup-shaped support 44 constituted of a plastic material which is transparent to microwave energy, whereas the upper surface of support 44, in essence, surface 48 may consist of either metal or have metal foil laminated to the plastic so as to constitute a shielding barrier against the through-passage of microwave energy.

Similarly, the perforated basket 50 for receiving the ground coffee, which is attached to the upper end portion of stem 42, may be constituted of metal or plastic, and incorporates a plurality of spaced perforations 52 in the bottom of the basket in a manner similar to that shown in the basket structure of FIG. 2. Moreover, the basket 30 or 50 of each embodiment may be provided with a plastic string 54 which will enable the pulling of the entire percolating unit 22 or 40 with the spent coffee grinds from the cup 12 subsequent to completion of the brewing process without having to reach into the cup or touch hot components, so that only the percolated coffee beverage will remain in the cup, in readiness for dispensing or drinking purposes.

Figure 9:
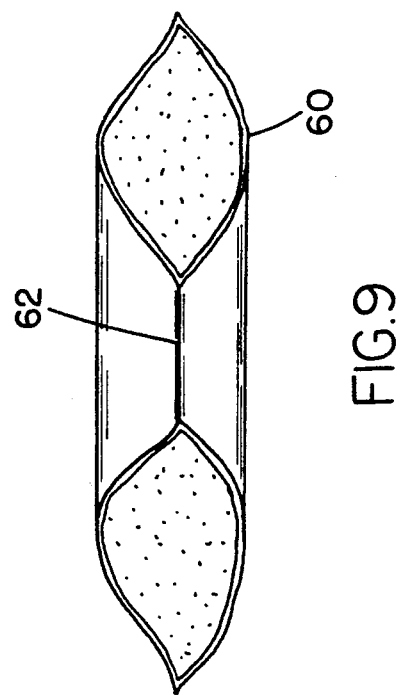
FIGS. 8 and 9 illustrate, respectively, top plan and transverse sectional views through a pouch constituted of a filter material containing a measured quantity of coffee adapted to be percolated in the inventive microwave brewing device.
Figure 8:
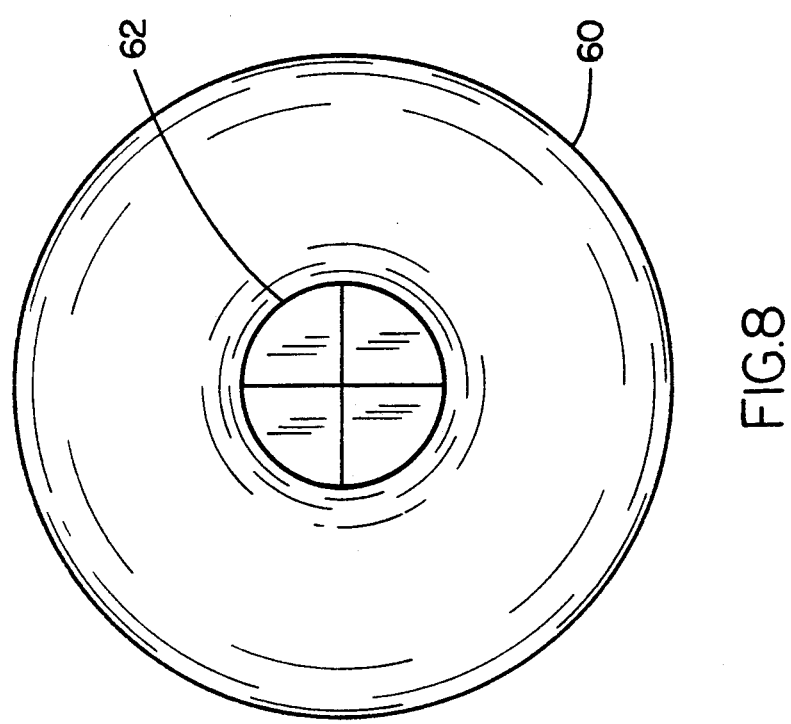

The baskets 30 or 50 of the percolating units 22 or 40 are each adapted to receive a predetermined measured quantity of coffee, which may be either in a loose state measured in by hand, or preferably packaged in a filter paper or cloth permeable to water, as is shown in FIGS. 8 and 9 illustrating the well-known "Max-Pac" donut-shaped package configuration for packaging a predetermined measure of roasted, ground coffee. The center of the donut-shaped coffee-containing package 60 includes an annular portion 62 sealed off from the coffee which is adapted to be pushed down over the upper end of the hollow stem 24 in the percolating unit 22 of FIG. 2, or the upper end of stem 42 of percolating unit 40 so as to come to rest on the perforated bottom surface of the basket 30; or respectively 50. Consequently, upon heating of the water in the cup 12, during percolation, as in any ordinary coffee percolator, the boiling water will be caused to rise upwardly through the hollow stem so as to impinge against the inner surface of the cover 38 and then be conveyed downwardly through the packaged coffee and the perforations in the basket back into the liquid contained in the cup 12. This continuous percolating cycle is then maintained for a predetermined interval of time, such a 1 to 3 minutes, until the microwaving operation is completed so to thereby produce a freshly percolated coffee beverage of the desired strength and amount in the cup 12.

Figure 11:
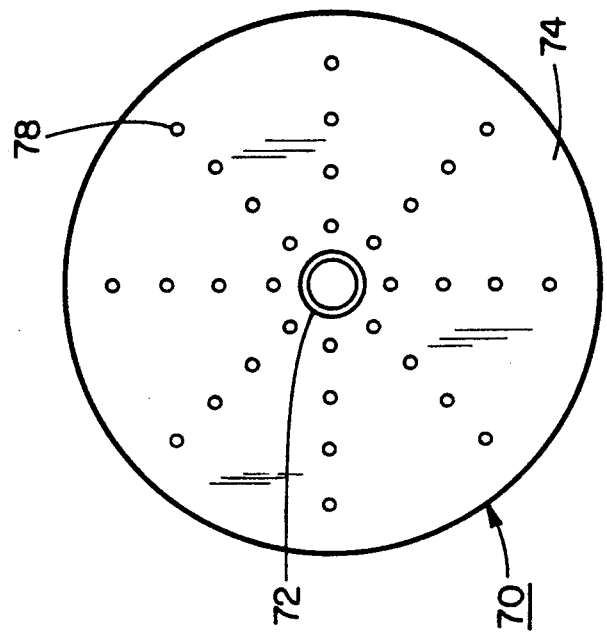
FIGS. 10 and 11 illustrate, respectively, transverse sectional and top plan views of a further embodiment of a percolating arrangement.
Figure 10:
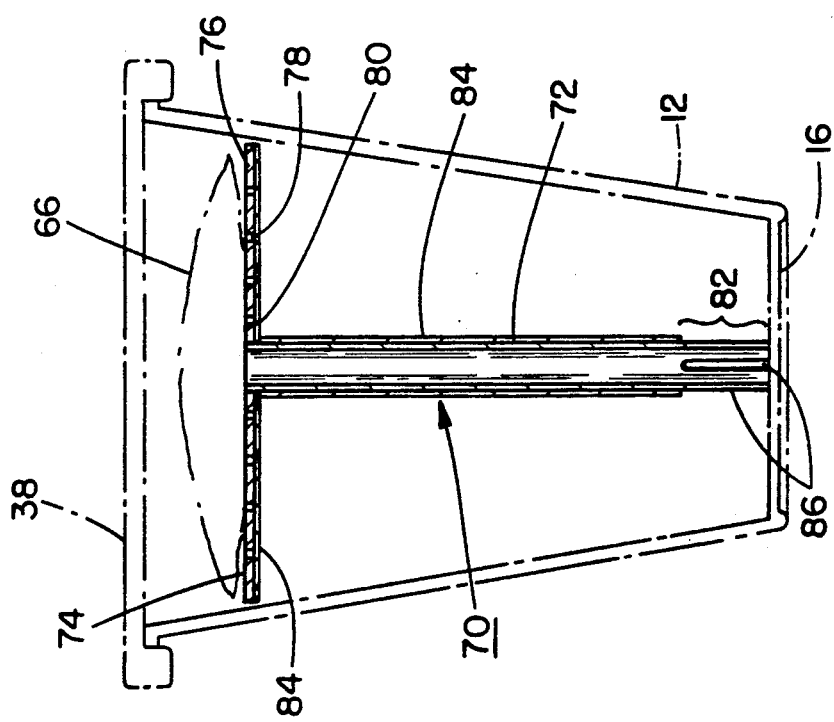

Pursuant to a further alternative, as illustrated in FIGS. 10 and 11, in lieu of the percolating units 22 or 40 with, respectively, perforated baskets 30 or 50, there may be provided a simpler construction for a percolating unit 70 which is adapted to be employed in the cup 12 for brewing a coffee or tea beverage. In this instance, the percolating unit is adapted to be utilized in the brewing of the beverage; for instance, freshly brewed coffee, from a quantity of ground coffee which is contained in a donut-shaped package of filter paper or water-permeable cloth, such as the widely-distributed "Max-Pac". Alternatively, the ground coffee-containing package may be in the shape of a pillow 66 having an essentially circular periphery.

Thus, in this embodiment, the percolating unit 70 possesses a hollow stem 72, preferably cylindrical in crosssection, having an upper end extending through a central hole formed in a circular plate member 76 and terminating in coplanar relationship with the upper surface 74 thereof, which plate member 76 is rigidly fastened to the upper end of the stem 72 to extend at right angles thereto. The plate member has a plurality of through-extending small perforations 78 formed therein in a radially and circumferentially spaced array, similar to the perforations 36 and 52 formed in, respectively, the baskets 30 and 50 of the other embodiments.

In this particular embodiment, both the stem 72 and the plate member 76 may be constituted of an inexpensive material, such as molded thermoplastic or impregnated paperboard, which are generally transparent to microwave energy. Consequently, in order to shield the upper region of the cup into which the percolating unit is 70 insertable from the ingress of microwaves, the lower surface 80 of the plate member 76 and the major portion of the length of stem 72 with the exception of the lower region 82 thereof, are each covered with a shielding 84 against microwave energy. This shielding 84 may be simply a thin metallic foil or foil-lined paper applied to or bonded to the contacting stem and plate member surfaces.

The lower end of the stem 72 is provided with a plurality of elongate, circumferentially spaced slots 86 which extend upwardly within the unshielded region 82 so as to facilitate the flow of water therethrough from the lower portion of the cup 12 into and upwardly through the interior of the stem 72. The length of the stem 72 is essentially such that when the lower end thereof rests on the interior surface of the bottom wall 16 of the cup 12, the upper surface 74 of the plate member 76 is at a height within the cup 12 substantially analogous to that of the bottoms 34 of the baskets 30, 50.

Since the percolating unit 70 is extremely inexpensive to manufacture, it readily lends itself to being offered to a consumer in conjunction with a coffee product, such as the "Max-Pac" or the pillow-shaped coffee-containing packages, as a so-called "Premium" or gift item to enhance the sales appeal for the packaged coffee. A pillow-shaped cylindrical package constituted of a filter paper and containing a measured quantity of roasted, ground coffee may then be laid flat on the surface of this perforated plate, and passed through in an upward direction by the boiling water flowing upwardly through the hollow stem, and in which the water is then again passed downwardly through the package and the perforations of the plate back into the liquid contained in the cup 12.

Basically, the entire structure of the microwave brewing device for producing percolated coffee beverages through microwave energy may be either completely disposable after a single use or, alternatively, some of the components of the device can be constructed so as to be reusable and saved for easy cleaning, such as in a dishwasher.

In essence, in preserving various of the components for reuse, this will permit the utilization of a stronger stainless steel or aluminum structure rather than employing cups with paper or plastic portions covered by a thin foil.

The entire microwave brewing or percolating device may be constituted of essentially five major constituents. Thus, both the cover 38, and the metal sleeve 18 for the cup 12 in FIG. 4 can be constituted of metal and retained for reuse and easy cleaning. Similarly, the percolator basket structure can be either made from a foil-lined paper or plastic arrangement, possibly disposable for single use, or may be constituted of a sturdier metal and plastic combination for reuse and cleaning in a dishwasher. Thus, the components which would then be employed in the basis of single use or disposability would be the package containing the coffee, and the cup 12 itself which is configured to be fitted to the reusable cover 38 and reusable metal sleeve 18 encasing the cup. The overall construction may be adapted for a specially sized cup so as to exclude other structures and maintain quality, and can be produced slightly larger than a standard cup to allow for the space taken by the percolating basket therein during the percolating sequence, or can be designed for standard foam cups to allow for the sale of only single cups of coffee.

The procedure for producing a single cup of coffee in the inventive device would be to fill the cup 12 with water to a specifically marked level, to position the cup in the metal sleeve 18, insert the percolating unit into the water-filled cup 12, position the coffee pack in the basket or on the plate at the upper end of the unit so as to encompass or overlie the upper end of the percolating stem, position the cover thereover, and then arrange the entire device 10 in a microwave oven for 1 to 3 minutes at full heating power. The cover may be designed to snap onto the outside sleeve 18 to prevent the latter from shipping down on the cup 12 and may also be designed to facilitate recirculating the percolating water egressing from the upper end of the hollow stem back into the cup and not into the annular space intermediate the cup and the sleeve, by providing a ridge at the cup.

As an alternative, the cup may be designed as shown in FIG. 1 so as to provide for a laminated metal foil rather than a metal sleeve, and in which the internal components consisting of the percolating unit and also the cover may be constructed of either water-impervious and heat resistant paper or plastic or of a foamed plastic type for heat conservation and ease of holding, and lined with metal foil as discussed hereinabove to prevent the entry of microwave energy into the upper regions of the cup containing the percolating unit. Consequently, after removal of the percolating unit together with the spent coffee grinds, and consumption of the beverage, all of the above components may be readily discarded.

While there has been shown and described what are considered to be preferred embodiments of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. Microwave brewing device for producing freshly percolate quantities of coffee in a microwave oven; comprising:
   (a) a disposable cup member having a bottom wall and an encompassing sidewall forming an opening at the upper end for the receipt of a predetermined quantity of water, said cup member being constituted from a material which is transparent to microwaves to enable the heating of said water to a brewing temperature in a microwave oven; microwave-impervious structure encompassing the upper region of the sidewall of said cup member forming a shielding against the passage therethrough of microwave energy and restricting the transparency to microwaves to the lower end portion of the sidewall of said cup member;

(b) a coffee percolating arrangement in said cup member, said arrangement including a central, vertical hollow stem, a support for said stem resting on the bottom of said cup member, said support including apertures communicating the water in said cup member with the interior of said stem, apertured means mounted proximate the upper end of said stem for supporting a measured quantity of roasted ground coffee; and (c) a lid detachably mounted on the upper end of said cup member in spaced relationship above said percolating arrangement, and means shielding at least the upper region interiorly of said cup member and the entire percolating arrangement excepting the lower end of said stem from microwave energy utilized for heating water in the lower portion of said brewing device.

2. Microwave brewing device as claimed in claim 1, wherein said shielding structure comprises a metallic sleeve encompassing said upper sidewall portion of the cup member.

3. Microwave brewing device as claimed in claim 1, wherein said cup member is constituted from a liquid-impervious paper composition.

4. Microwave brewing device as claimed in claim 1, wherein said cup member is constituted from a plastic material.

5. Microwave brewing device as claimed in claim 4, wherein said plastic material comprises foamed polyurethane.

6. Microwave brewing device as claimed in claim 1, wherein at least the support for the stem of said percolating arrangement is constituted of a material which is transparent to microwave energy.

7. Microwave brewing device as claimed in claim 6, wherein said stem and said coffee-supporting means are constituted from a metallic material which is impervious to microwave energy.

8. Microwave brewing device as claimed in claim 6, wherein the stem is constituted from a plastic material.

9. Microwave brewing device as claimed in claim 6, wherein said support for the stem has an upper surface portion spaced from the bottom said cup member which includes a microwave energy-shielding material so as to shield the upper portion of the percolating arrangement from microwave energy.

10. Microwave brewing device as claimed in claim 1, wherein said percolating arrangement is constituted from a moisture-impervious paper so as to render the arrangement disposable after a single use.

11. Microwave brewing device as claimed in claim 1, wherein said percolating arrangement is constituted from a plastic material.

12. Microwave brewing device as claimed in claim 1, wherein said detachable lid is constituted from a material which is impervious to microwave energy.

13. Microwave brewing device as claimed in claim 12, wherein said lid material comprises metal.

14. Microwave brewing device as claimed in claim 12, wherein said lid material comprises plastic, and a metallic liner covering the surface of said plastic.

15. Microwave brewing device as claimed in claim 1, wherein said coffee-supporting means comprises a perforated basket encompassing the upper end portion of said stem.

16. Microwave brewing device as claimed in claim 15, wherein said perforated basket is adapted to receiving a quantity of coffee encased in a toroidally-shaped package of a liquid-permeable filter paper.

17. Microwave brewing device as claimed in claim 1, wherein said coffee-supporting means comprises a flat perforated disc member mounted to radially extend about the upper end of said stem, said plate member being adapted to support a quantity of coffee contained in a pillow-shaped or toroidally-shaped package of a liquid-permeable filter paper.

18. A percolating arrangement for producing freshly percolated quantities of coffee in a microwave oven, said arrangement comprising a closeable cup member constituted of microwave-transparent material, a hollow stem of microwave transparent material having an upper portion and a lower portion, said hollow stem extending vertically upwardly within said cup member supported on the bottom wall of said cup member and terminating below the upper edge of said cup member; a flat horizontally extending perforated disc member mounted on the upper portion of said hollow stem to facilitate passage of water from the lower portion of said cup member through openings formed in the lower portion of said stem up through the stem interior onto said disc member and downwardly through perforations of said disc member after passage through packaged coffee supported on said disc member; and means shielding said disc member and the upper portion of said hollow stem from microwave energy while the lower portion of said hollow stem is free of said shielding means.

* * * * *